United States Patent
Plaziak et al.

(10) Patent No.: US 9,989,400 B2
(45) Date of Patent: *Jun. 5, 2018

(54) METHOD TO PROVIDE A QUALITY MEASURE FOR METER VERIFICATION RESULTS

(71) Applicant: Schneider Electric Systems USA, Inc., Foxboro, MA (US)

(72) Inventors: Michael T. Plaziak, Chepachet, RI (US); Wade Mattar, Wrentham, MA (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/594,144

(22) Filed: May 12, 2017

(65) Prior Publication Data

US 2017/0248461 A1 Aug. 31, 2017

Related U.S. Application Data

(63) Continuation of application No. 14/530,400, filed on Oct. 31, 2014, now Pat. No. 9,689,736.

(51) Int. Cl.
| | |
|---|---|
| *G01F 1/00* | (2006.01) |
| *G01F 1/84* | (2006.01) |
| *G01F 25/00* | (2006.01) |
| *G01F 1/32* | (2006.01) |
| *G01F 1/58* | (2006.01) |
| *G01F 1/74* | (2006.01) |
| *G01F 15/02* | (2006.01) |

(52) U.S. Cl.
CPC ............ *G01F 25/0007* (2013.01); *G01F 1/32* (2013.01); *G01F 1/58* (2013.01); *G01F 1/74* (2013.01); *G01F 1/845* (2013.01); *G01F 1/8436* (2013.01); *G01F 1/8486* (2013.01); *G01F 15/024* (2013.01)

(58) Field of Classification Search
CPC ..... G01F 1/00; G01F 1/32; G01F 1/58; G01F 1/84; G01F 25/0007; G01F 1/74; G01F 1/8436; G01F 1/8486; G01F 15/024; G01F 1/845
See application file for complete search history.

(56) References Cited

U.S. PATENT DOCUMENTS 5,926,096 A * 7/1999 Mattar ................. G01F 1/8413
340/606
6,532,829 B1 * 3/2003 Franklin .................. G01F 1/00
73/861.66

(Continued)

FOREIGN PATENT DOCUMENTS

DE 102009000749 A1 * 8/2010 .......... G01F 1/8436
WO WO 2007040542 A1 * 4/2007 .......... G01F 1/8413

*Primary Examiner* — Nguyen Ha
(74) *Attorney, Agent, or Firm* — Stephen Manetta; Ralph Graham; Senniger Powers

(57) ABSTRACT

A system for evaluating a flow rate measurement includes a flowmeter and a diagnostic system. The diagnostic system is configured to perform a diagnostic test for detecting a physical change in the flowmeter that could impair operation of the flowmeter, output a result of the diagnostic test, evaluate a reliability of the diagnostic test using information about a process condition, and output an indication of the reliability of the diagnostic test.

20 Claims, 11 Drawing Sheets

(56) References Cited

U.S. PATENT DOCUMENTS

| | | | | |
|---|---|---|---|---|
| 6,634,238 | B2* | 10/2003 | Budmiger | G01F 15/022 73/861.12 |
| 9,658,097 | B2* | 5/2017 | Berndt | G01F 25/0007 |
| 9,689,736 | B2* | 6/2017 | Plaziak | G01F 25/0007 |
| 2008/0184813 | A1* | 8/2008 | Patten | G01F 1/8413 73/861.355 |
| 2008/0281535 | A1* | 11/2008 | Rensing | G01F 1/8413 702/56 |
| 2013/0228003 | A1* | 9/2013 | Bierweiler | G01F 1/8436 73/1.16 |
| 2014/0111342 | A1* | 4/2014 | Ramsay | G01F 1/662 340/606 |
| 2015/0276451 | A1* | 10/2015 | Alves | G01F 25/0007 73/861.357 |
| 2016/0116319 | A1* | 4/2016 | Rensing | G01F 1/8477 73/861.357 |

* cited by examiner

METHOD TO PROVIDE A QUALITY MEASURE FOR METER VERIFICATION RESULTS

CROSS REFERENCE TO RELATED APPLICATIONS

This application is a continuation of U.S. patent application Ser. No. 14/530,400, filed Oct. 31, 2014, the entire contents of which are hereby incorporated by reference.

FIELD OF THE INVENTION

The present invention relates to flowmeters, and more particularly to systems and methods for meter verification of a flowmeter.

BACKGROUND OF THE INVENTION

Various flowmeters are used to measure the flow rate of a fluid through the meter. Some examples include vortex flowmeters, magnetic flowmeters, Coriolis flowmeters, and others.

A Coriolis flowmeter is one type of flowmeter that is used to measure mass flow rate and density of a fluid. In a conventional Coriolis flowmeter, fluid flows through one or more conduits (broadly, a flowtube) as one or more drivers oscillates the conduits. Two or more sensors detect the motion of the flowtube at different locations along the flowtube. Forces associated with acceleration of fluid flowing through the oscillating flowtube produce a phase difference in the signals from the sensor. This phase difference is related to the mass flow rate of fluid through the flowtube. Thus, a measurement of mass flow rate can be obtained from the phase difference in the sensors. The resonant frequency of the flowtube varies with density of the fluid in the flowtube. Thus, a Coriolis meter can also provide a measure of density by tracking the resonant frequency of the flowtube. Although these basic principles of operation are fairly simple, many sophisticated control and measurement techniques can be used to improve the basic measurement techniques to compensate for various factors, such as temperature changes, pressure changes, effects of multiphase fluid flow, and many other variables that affect operation of the Coriolis meter. For example U.S. Pat. Nos. 6,311,136; 6,505,519; 6,950,760; 7,059,199; 7,614,312; 7,660,681; 7,617,055; and 8,751,171, the contents of which are each hereby incorporated by reference, illustrate some of the more advanced techniques known for improving measurement and operation of a Coriolis meter.

Measurement accuracy in Coriolis flowmeters depends, in part, on whether the meter is properly calibrated. Typically, calibration data is used to convert raw sensor signals to mass flow and density measurements. This calibration data can, for example, account for the physical properties of the flowtube (e.g., stiffness, etc.). In some applications, the fluid flowing through a Coriolis flowmeter is corrosive, abrasive, caustic, etc. Such fluids and/or other environmental conditions can cause a flowtube to become damaged through wear or other breakage. However, when the physical properties of the flowtube change, the calibration data becomes out of date, and the measurement system can produce inaccurate measurements. Thus, normal wear on the Coriolis meter can cause deterioration of performance. Eventually, the damage from wear can become so severe that the flowmeter catastrophically fails. Catastrophic failure of a Coriolis flowmeter can cause substantial and costly damage to the process facility where it is used, particularly where it results in release of materials that are corrosive, caustic, harmful to the environment or otherwise difficult to clean up.

To avoid catastrophic failure and limit measurement inaccuracies, some Coriolis flowmeters are equipped with meter verification systems. These systems monitor the calibration accuracy of a flowmeter to verify whether it is producing reliable measurements. They typically output a qualitative indication of whether the current measurements are accurate. For example, U.S. Pat. No. 5,926,096, the contents of which are hereby incorporated by reference, provides more detail on one type of meter verification system that can be used in a Coriolis meter. Other meter verification systems are also used in Coriolis meters. Similar meter verification systems are used in connection with vortex flowmeters, magnetic flowmeters, and other flowmeters.

The present inventors have made certain improvements in the field of flowmeter verification systems, which will be described in detail below.

SUMMARY OF THE INVENTION

One aspect of the invention is a method for evaluating a Coriolis mass flowmeter having a flowtube, a driver for driving the flowtube, a pair of sensors for sensing a vibrational response of the flowtube at different locations and providing signals representative of the vibrational response, and a processor configured to determine a mass flow rate of a fluid flowing through the flowtube based on a phase difference between the sensor signals. The method includes performing a diagnostic test for detecting a physical change in the flowtube that could impair operation of the Coriolis mass flowmeter. A result of the diagnostic test is output. A reliability of the diagnostic test is evaluated using information about process conditions. An indication of the reliability of the diagnostic test is output.

Another aspect of the invention is a system for evaluating a mass flow rate measurement. The system includes a Coriolis flowmeter including a flowtube, a driver for driving the flowtube, and a pair of sensors for sensing a vibrational response of the flowtube at different locations and providing sensor signals representative of the vibration. The system has a diagnostic system configured to perform a diagnostic test for detecting a physical change in the flowtube that could impair operation of the Coriolis mass flowmeter and output a result of the diagnostic test. The diagnostic system is also configured to evaluate a reliability of the diagnostic test using information about a process condition and output an indication of the reliability of the diagnostic test.

Still another aspect of the invention is a system for evaluating a flow rate measurement. The system includes a flowmeter and a diagnostic system. The diagnostic system is configured to perform a diagnostic test for detecting a physical change in the flowmeter that could impair operation of the flowmeter and output a result of the diagnostic test. The diagnostic system is also configured to evaluate a reliability of the diagnostic test using information about a process condition and output an indication of the reliability of the diagnostic test.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
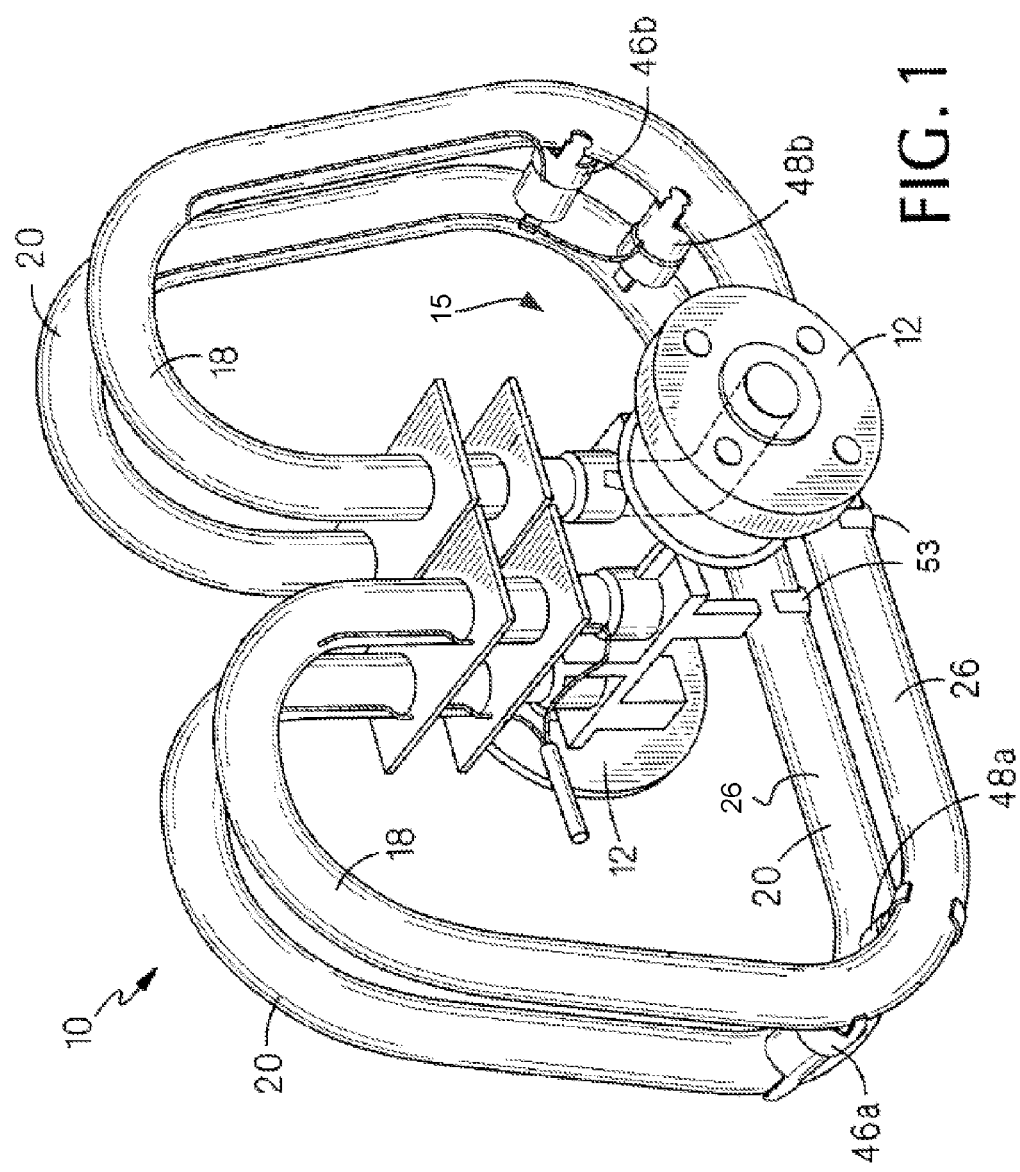
FIG. 1 is a perspective view of one embodiment of a Coriolis flowmeter.
Figure 2:
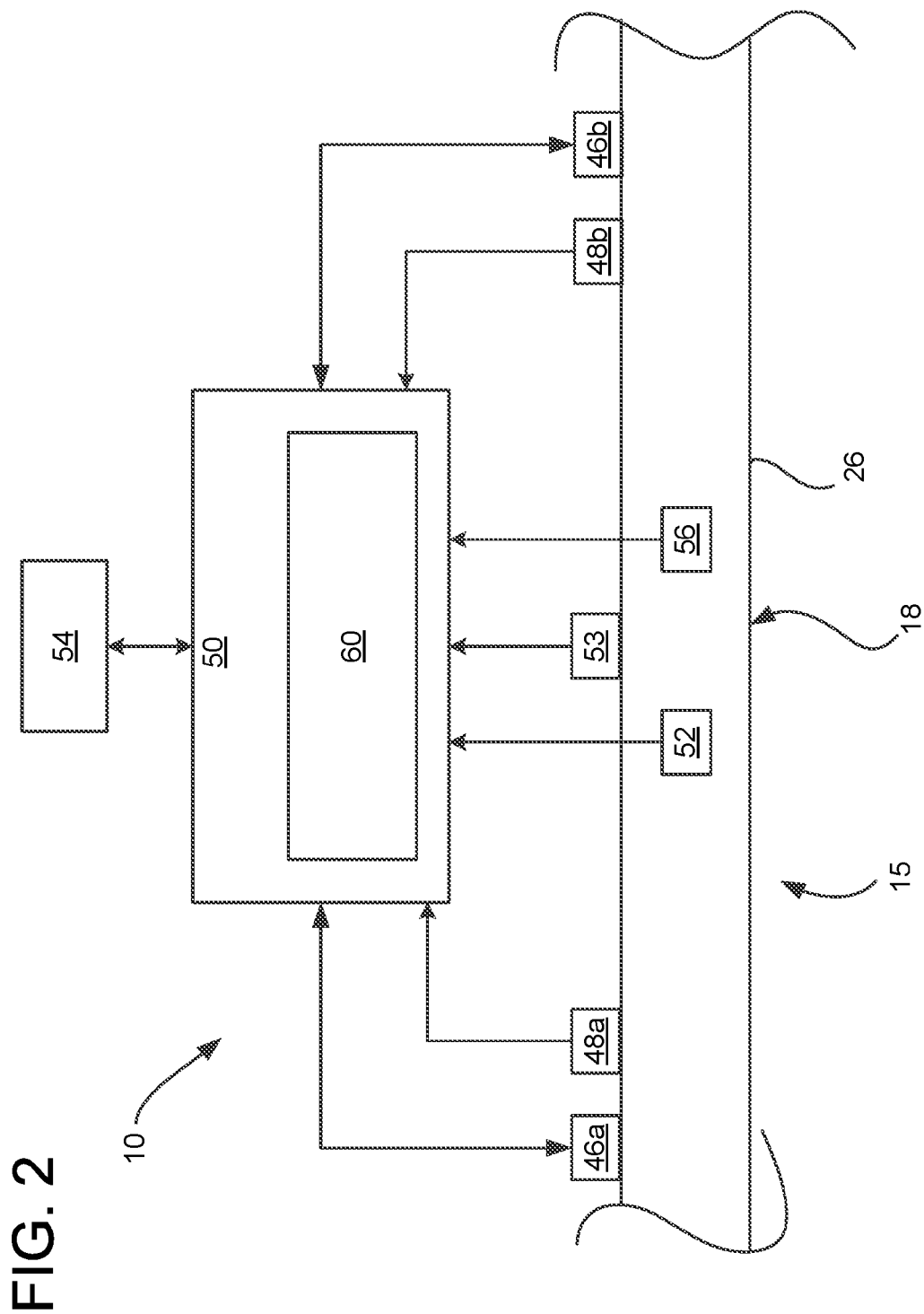
FIG. 2 is a schematic diagram of a Coriolis flowmeter in one embodiment of a distributed control system.

Referring to FIGS. 1 and 2, an embodiment of a Coriolis flowmeter is generally indicated at reference number 10. In the illustrated embodiment, the flowmeter 10 includes a flowtube 15 comprising a pair of conduits 18, 20. The flowmeter 10 is fluidly connected to a pipeline (not shown) at upstream and downstream flanges 12. Fluid flows into an inlet of the flowmeter 10, through each of the conduits 18, 20 (in series), and out an outlet of the flowmeter. Each of the conduits 18, 20 in FIG. 1 has a straight section 26 that is arranged in the same plane with the straight section of the other conduit. The conduits 18, 20 also having a looping configuration. Other configurations of the conduits (e.g., straight tube configurations, U-shaped configurations, etc.) are also possible.

The flowmeter 10 has a pair of drivers 46a, 46b, positioned to drive oscillations of the flowtube 15, as illustrated in FIG. 1, but it is possible to drive oscillation of a flowtube using only a single driver within the scope of the invention. Sensors 48a, 48b are positioned at different locations on the flowtube for detecting the movement of the flowtube at different locations. In FIG. 1, for example, the sensors 48a, 48b are positioned at opposite ends of the straight sections 26 of the loops 18, 20. The sensors 48a, 48b are configured to output signals indicative of the movement of the conduits 18, 20. In FIG. 1, the sensors 48a, 48b are positioned between the conduits 18, 20 and are adapted to detect movement of one conduit relative to the other at the location of the respective sensor. The flowmeter 10 also includes a temperature sensor 52 that is positioned to measure the temperature of fluid in the flowtube 15 and another temperature sensor 53 that is positioned to measure the temperature of the flowtube, as illustrated in FIG. 2. The flowmeter 10 in FIG. 2 also includes a pressure sensor 56 positioned to measure the pressure of fluid inside the flowtube 15. Though FIG. 2 depicts the temperature sensors 52, 53 and pressure sensor 56 as components of the flowmeter 10, it is understood that the fluid temperature and pressure sensors 52, 56 can be separate devices and may be installed in proximity to the flowmeter in a pipeline conveying fluid to or away from the flowmeter.

Referring to FIG. 2, the flowmeter 10 has control and measurement system 50 that receives the signals from the sensors 48a, 48b. The control and measurement system 50 suitably includes a processor configured to determine a mass flow rate of fluid flowing through the flowtube 15 based on a phase difference between the sensor signals 48a, 48b. The processor is suitably further configured to determine the density of the fluid (e.g., using a correlation with the resonant frequency of the flowtube 15). As illustrated in FIG. 2, the control and measurement system 50 also receives signals from the temperature sensors 52, 53. The processor suitably compensates the mass flow rate measurement and the density measurement using temperature data from the temperature sensors 52 and 53 and from the pressure sensor 56. In addition to mass flow rate and fluid density, the flowmeter 10 is suitably configured to use the signals received from one or more of the sensors 48a, 48b, temperatures sensors 52 and 53, and pressure sensor 56 to calculate void fraction and/or viscosity of the fluid in the flowtube 15. The flowmeter 10 and, more specifically, the control and measurement system 50 is suitably configured to send measurements (e.g., measurements of mass flow rate, density, and/or gas void fraction) to a distributed control system 54 for use in controlling a process or plant controlled by the distributed control system.

The control and measurement system 50 is suitably also configured to generate a drive signal that is supplied to the drivers 46a, 46b to drive vibration of the flowtube 15. For example, the control and measurement system 50 suitably determines an appropriate drive signal based on the signals from the motion sensors 48a, 48b. Moreover, the flowmeter 10 is configured to transition between a plurality of control states when driving the flowtube 15. For example, the control and measurement system 50 suitably operates in a first control state when starting vibration of flowtube 15 from rest, in a second state when sustaining oscillation of the flowtube 15 during flow of a single phase fluid through the flowtube, and a third control state when the control and measurement system 50 detects the onset of multi-phase flow in the flowtube 15, such as aeration of a liquid flow or condensation in a gas flow. In each of the above-described control states, the control and measurement system 50 may use a different algorithm to generate the drive signal and the drive signal may have different characteristics. Other control states in addition to or different from those listed above can also be used without departing from the scope of the invention.

Figure 3:
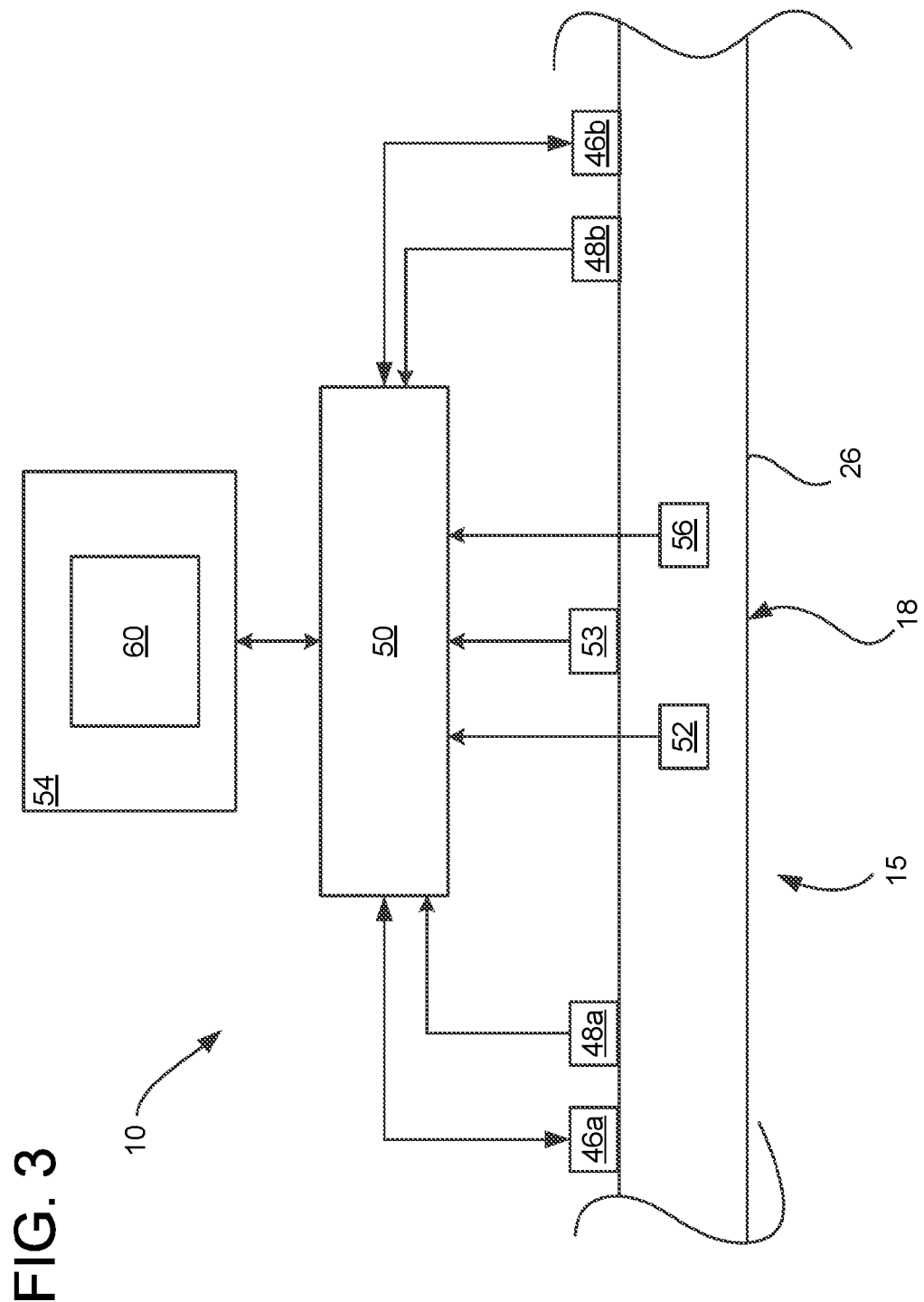
FIG. 3 is a schematic diagram of a Coriolis meter in another embodiment of distributed control system.
Figure 4:
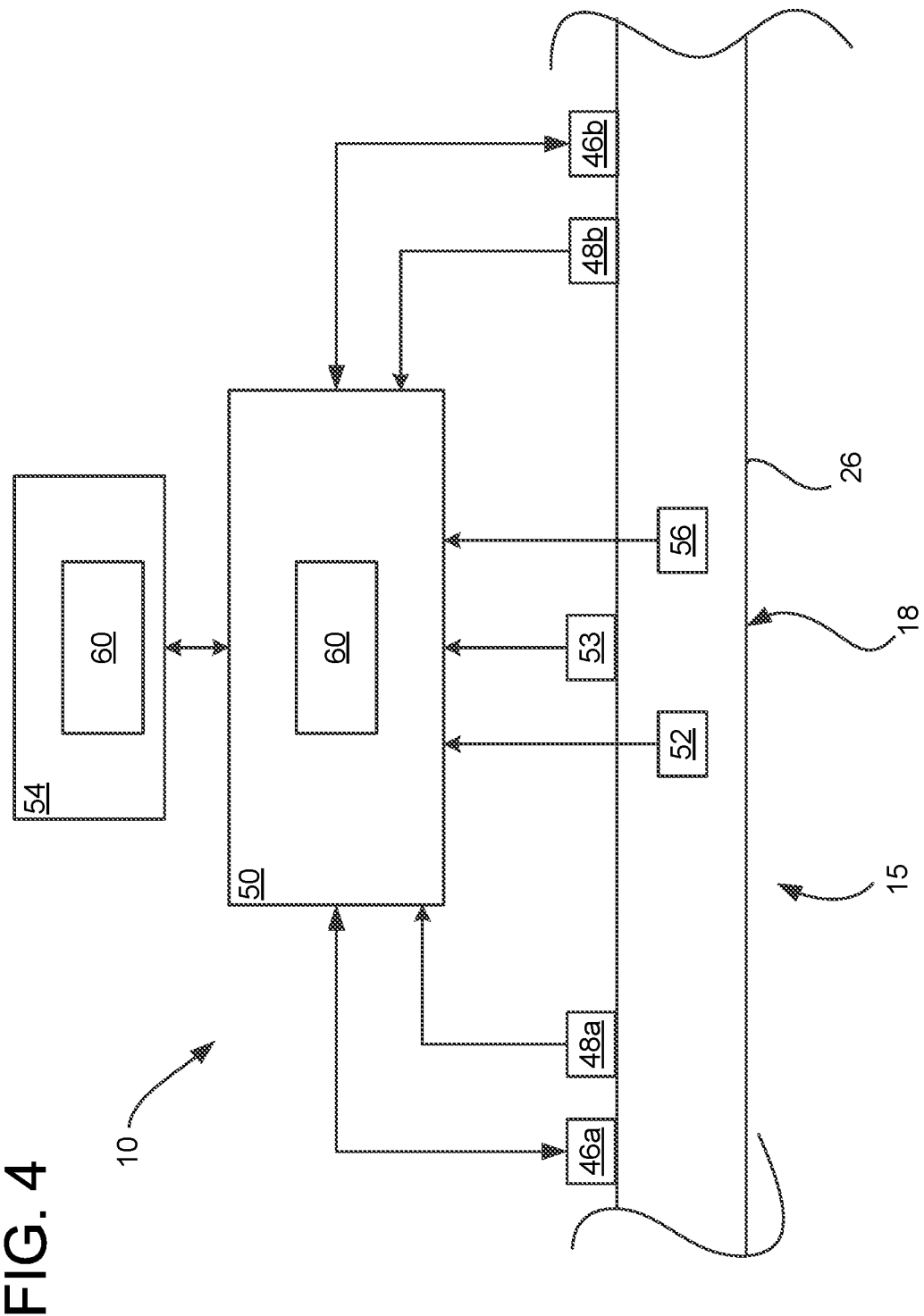
FIG. 4 is a schematic diagram of a Coriolis meter in another embodiment of distributed control system.

The control and measurement system 50 is suitably configured to receive and/or record data associated with the drivers 46a, 46b (e.g., data about the energy supplied to the drivers to maintain oscillation of the flowtube 15). The control and measurement system 50 is suitably also configured to receive information from the distributed control system 54 (e.g., data about events in the distributed control system or associate with devices connected to the distributed control system). As illustrated in FIG. 2, the control and measurement system 50 includes a diagnostic system 60 to perform diagnostic tests on the flowmeter. In addition to conducting diagnostic tests on the flowmeter, the diagnostic system suitably also evaluates the reliability of the diagnostic test. For example, the reliability of the diagnostic test may be less reliable when the flowmeter is or has recently transitioned between different control states. Likewise, the diagnostic test may be less reliable when the flowmeter is operating under rapidly changing conditions. Although the diagnostic system 60 is a component of the flowmeter control and measurement system 50 in FIG. 2, it is understood that some or all of the diagnostic system 60 can include a processor of the distributed control system 54 (e.g., as illustrated in FIG. 3). Likewise, it is possible that part of the diagnostic system 60 is included in the flowmeter control and measurement system 50 while another part of the diagnostic system resides in the distributed control system 54, as illustrated in FIG. 4. Further, the diagnostic system may run on a processor that is external to both the flowmeter 10 and the distributed control system 54 (e.g., a handheld field unit, etc.) without departing from the scope of the invention.

Figure 5:
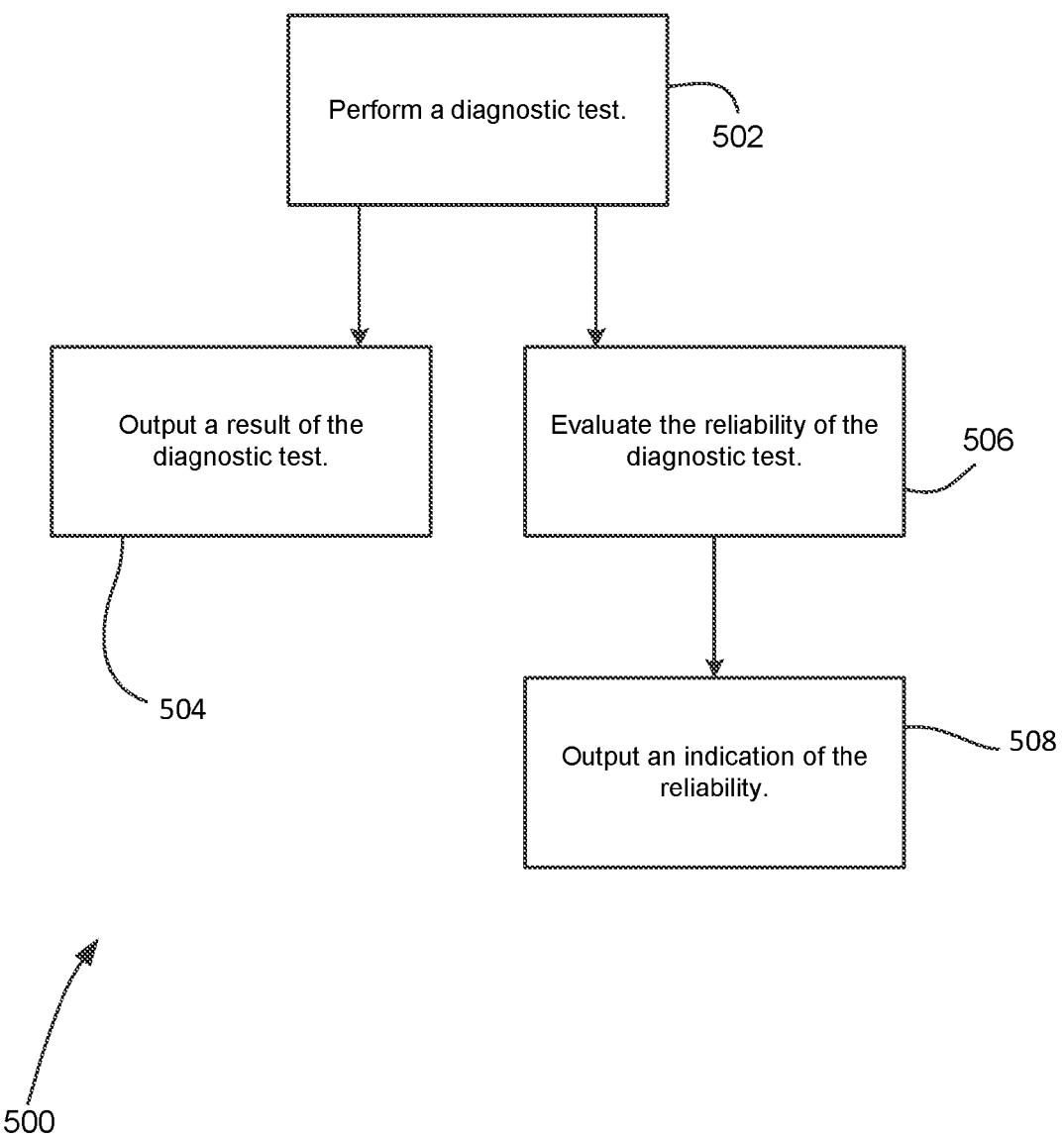
FIG. 5 is a flowchart illustrating operation of one embodiment of a meter verification system suitable for a Coriolis flowmeter.

The diagnostic system 60 is configured to perform a method for evaluating the Coriolis mass flowmeter 10. One embodiment of such a method, generally designated 500, is illustrated in FIG. 5. At step 502, the diagnostic system 60 performs a diagnostic test for detecting a physical change in the flowtube 15 that could impair operation of the Coriolis mass flowmeter 10. As discussed in more detail below, various diagnostic tests may be used to detect changes that risk impairing operation of the flowmeter 10. For example, the diagnostic test can be designed to detect wear or other physical effects caused by fluids flowing through the flowtube 15. For example, when abrasive process fluid flows through a flowtube, it can cause erosion at the inner surface of the flowtube. Erosion weakens the flowtube and reduces its stiffness. Changes in the stiffness of the flowtube 15 reduce the measurement accuracy of the flowmeter 10 (e.g., by altering the vibrational characteristics of the flowtube from that for which the flowmeter is calibrated), and weakening the flowtube's structure presents a risk of catastrophic failure. In other applications, fluids flowing through a flowtube contain parrafins or other compositions that are capable of being deposited on the interior surfaces of the flowtube 15. As material is deposited on the flowtube 15, its vibrational properties may change and, thus, measurement accuracy can be reduced. Another problem that can arise is formation of microscopic cracks in the flowtube 15 (e.g., due to fatigue). Accordingly, the diagnostic system 60 is suitably configured to conduct a diagnostic test capable of detecting whether or not the flowtube 15 has experienced one or more of these types of changes. Several suitable techniques for detecting such problems are described in more detail below, but it is understood that any diagnostic test for detecting a physical change in the flowtube 15 can be used without departing from the scope of the invention.

At step 504, the diagnostic system 60 outputs a result from the diagnostic test performed in step 502. The form of the result output in step 504 may vary. For example, the result is suitably output on a local display of the Coriolis flowmeter 10. Alternatively or additionally, the result can output to the distributed control system 54. Still other display devices and systems may be used to output the result without departing from the scope of the invention. In addition, the content of the result output in step 504 may vary. For example, the result is suitably a qualitative indication of whether the flowtube 15 has changed physically such that the operation of the flowmeter 10 is impaired and/or a quantitative report of measured parameters used in the diagnostic test of step 502. One skilled in the art will appreciate that the result output in step 504 may include additional or different content without departing from the scope of the invention.

In step 506, the diagnostic system 60 evaluates the reliability of the diagnostic test performed in step 502. As will be discussed in greater detail below, the diagnostic system 60 is suitably configured to evaluate the reliability of the diagnostic test using information about process conditions that may affect operation of the flowmeter 10. Certain process conditions affect the reliability of the diagnostic tests performed in step 502. As shown in FIGS. 2-4, the diagnostic system 60 receives data containing information about process conditions from one or more of the drivers 46a, 46b, the sensors 48a, 48b, the temperature sensors 52 and 53, the pressure sensor 56, and the distributed control system 54. Data containing information about process conditions from additional and/or different sources can also be provided to the diagnostic system 60 without departing from the scope of the invention. Thus, the reliability of the diagnostic test performed in step 502 is evaluated in step 506 using information available to the diagnostic system about the process conditions. In step 508, the diagnostic system outputs an indication of the reliability of the diagnostic test that represents the results of the evaluation performed in step 506. A user may use the output of the evaluation to determine whether corrective action needs to be taken.

Figure 6:
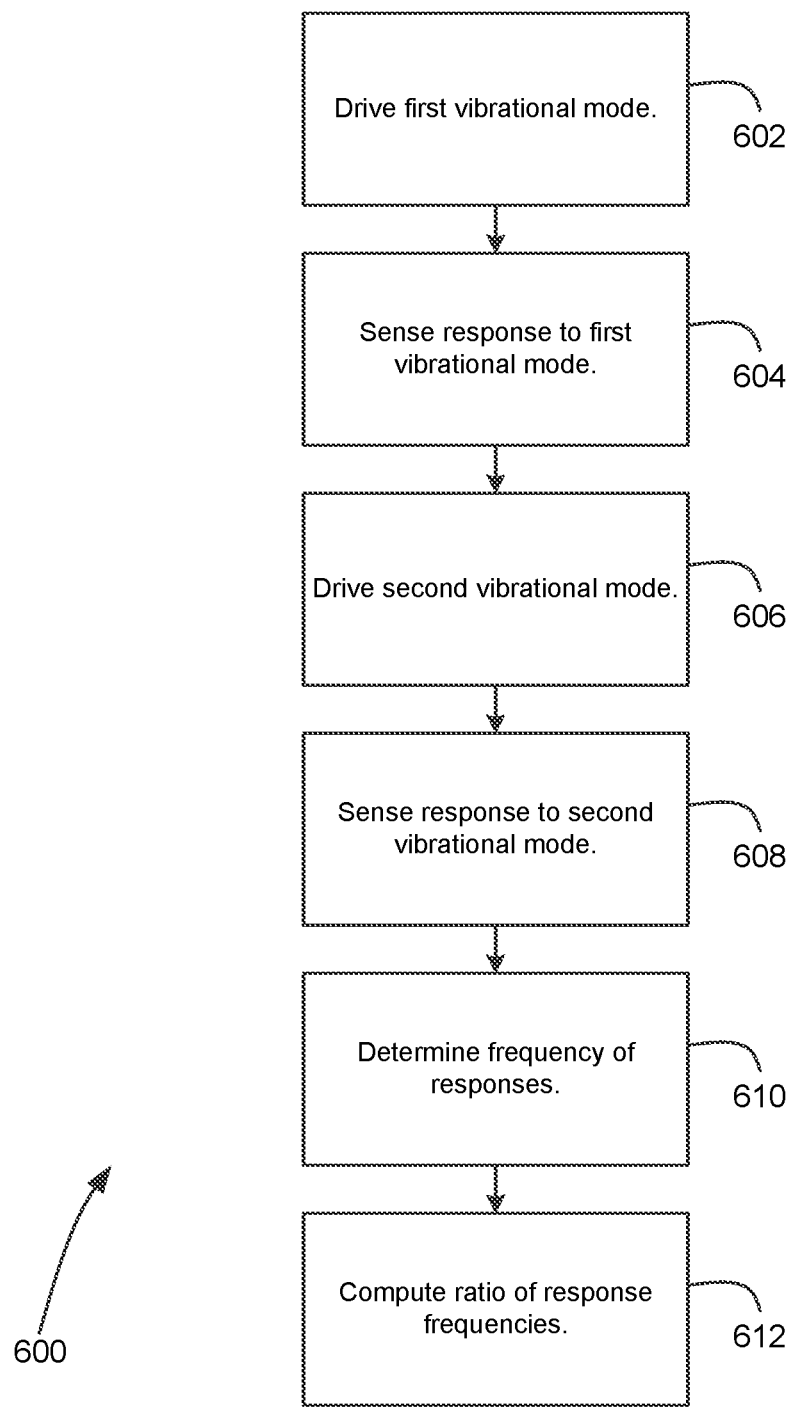
FIG. 6 is a flowchart illustrating one embodiment of a diagnostic test by the meter verification system.

One embodiment of a suitable diagnostic test method 600 is illustrated in FIG. 6. This diagnostic test 600 is based on monitoring changes in the ratio of two resonant frequencies of the flowtube 15. The diagnostic test 600 begins at step 602, in which the diagnostic system 60 drives the flowtube 15 in a first vibrational mode. At step 604, the diagnostic system 60 senses a first vibrational response of the flowtube 15 to the first vibrational mode. At step 606, the diagnostic system 60 drives the flowtube 15 in a second vibrational mode that is different from the first vibrational mode of step 602. In step 608, the diagnostic system 60 senses a second vibrational response of the flowtube 15 to the second vibrational mode. The diagnostic system 60 determines a resonant frequency for the first and second vibrational modes from the frequency responses that were sensed respectively in steps 604 and 608. Although this is illustrated as a single step 610 in FIG. 6, it is understood that the resonant frequencies could be done in two separate steps and in various different orders. The diagnostic system 60 then computes a ratio of the resonant frequency of the first vibrational response to the resonant frequency of the second vibrational response. If the ratio of the resonant frequencies has changed significantly (e.g., since the last diagnostic test or since an initial assessment), this may indicate a problem.

Figure 7B:
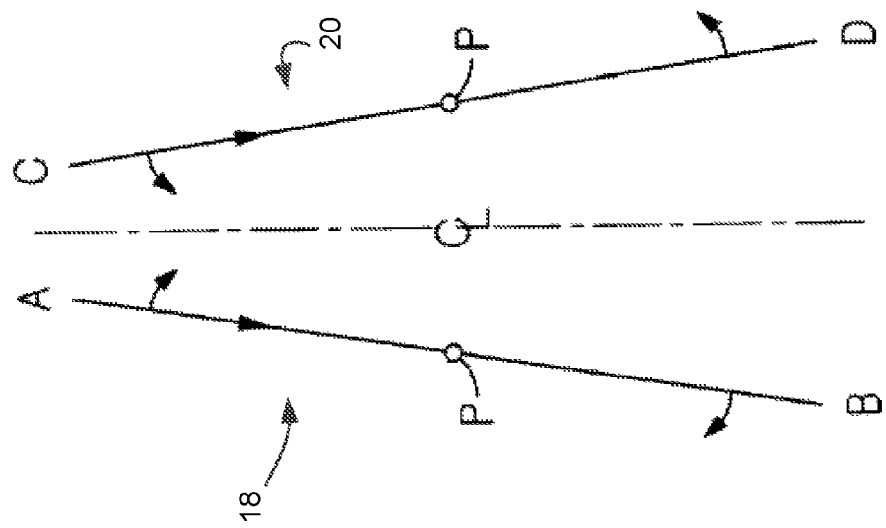
FIG. 7B is a schematic top view of the flowtube in FIG. 7A illustrating an antisymmetrical vibrational mode.
Figure 7A:
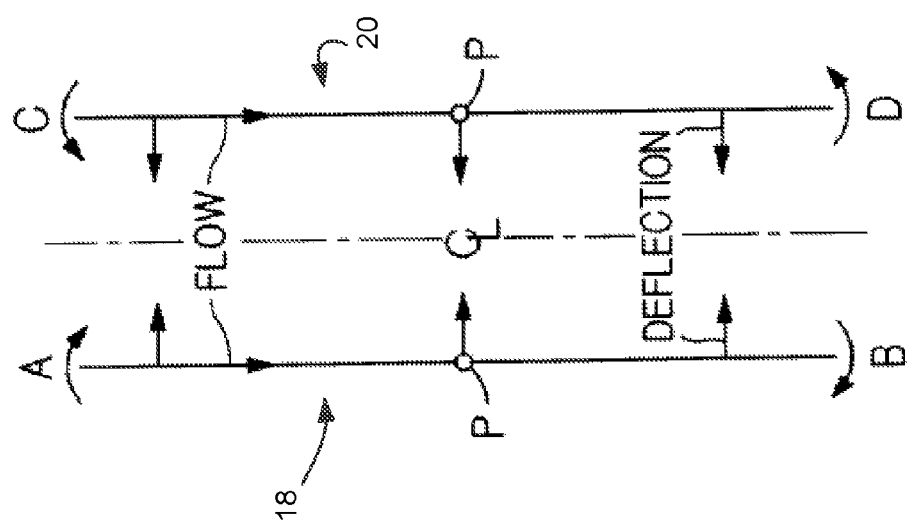
FIG. 7A is schematic top view of one embodiment of a flowtube of a Coriolis flowmeter illustrating a symmetrical vibrational mode.

The particular vibrational modes at which the flowtube 15 is driven in steps 602 and 606 can include any two different vibrational modes that induce a flowtube to vibrate at different resonant frequencies. For example, as shown in FIGS. 7A and 7B, the first vibrational mode is suitably a symmetrical vibrational mode of the flowtube 15 and the second vibrational mode is suitably an anti-symmetrical vibrational mode of the flowtube. The control and measurement system 50 suitably sends signals to the drivers 46a, 46b that are in phase with one another to drive the flowtube 15 in the symmetric mode and sends the drivers signals that are out of phase with one another to drive the flowtube in the anti-symmetric mode. In the symmetrical mode, the straight sections 26 of the loops 18, 20 move, opposite ends at the same time, toward and then away from one another, as illustrated in FIG. 7A. As shown in FIG. 7B, in the anti-symmetrical vibrational mode the straight section of each loop 18, 20 of the flowtube is driven to rotate around its perpendicular bisector P. When driven in the anti-symmetrical vibrational mode, the straight sections 26 of each of the loops 18, 20 sweep out the shape of a bowtie. It is noted that in the embodiment illustrated in FIG. 1, the anti-symmetric mode is the mode used during operation of the flowmeter 10 for measurement purposes. Thus, the diagnostic test 600 requires only a brief interruption in normal operation of the flowmeter 10 to drive the flowtube 15 in the symmetric mode for step 606 of the test 600. Thus, all other steps 602, 604, 608, 610, and 612 can run in the background during normal operation of the flowmeter 10.

The flowtube 15 has different resonant frequencies in the symmetrical and antisymmetrical vibrational modes. A change in the ratio of the resonant frequencies between the antisymmetrical and symmetrical drive modes can indicate that a physical characteristic of the flowtube 15 has changed. Likewise, a change in the ratio of resonant frequencies between any other first and second vibrational modes can, under certain conditions, indicate that a physical characteristic of a flowtube 15 has changed. The Coriolis meter illustrated in FIG. 1 uses the anti-symmetrical vibrational mode during normal operation of the flowmeter to obtain measurements, it is noted that other Coriolis meters use the symmetrical vibrational mode during normal operation of the flowmeter to obtain measurements. The diagnostic test 600 illustrated in FIG. 6 is generally useful, but the results may be unreliable, especially under certain conditions.

Figure 8:
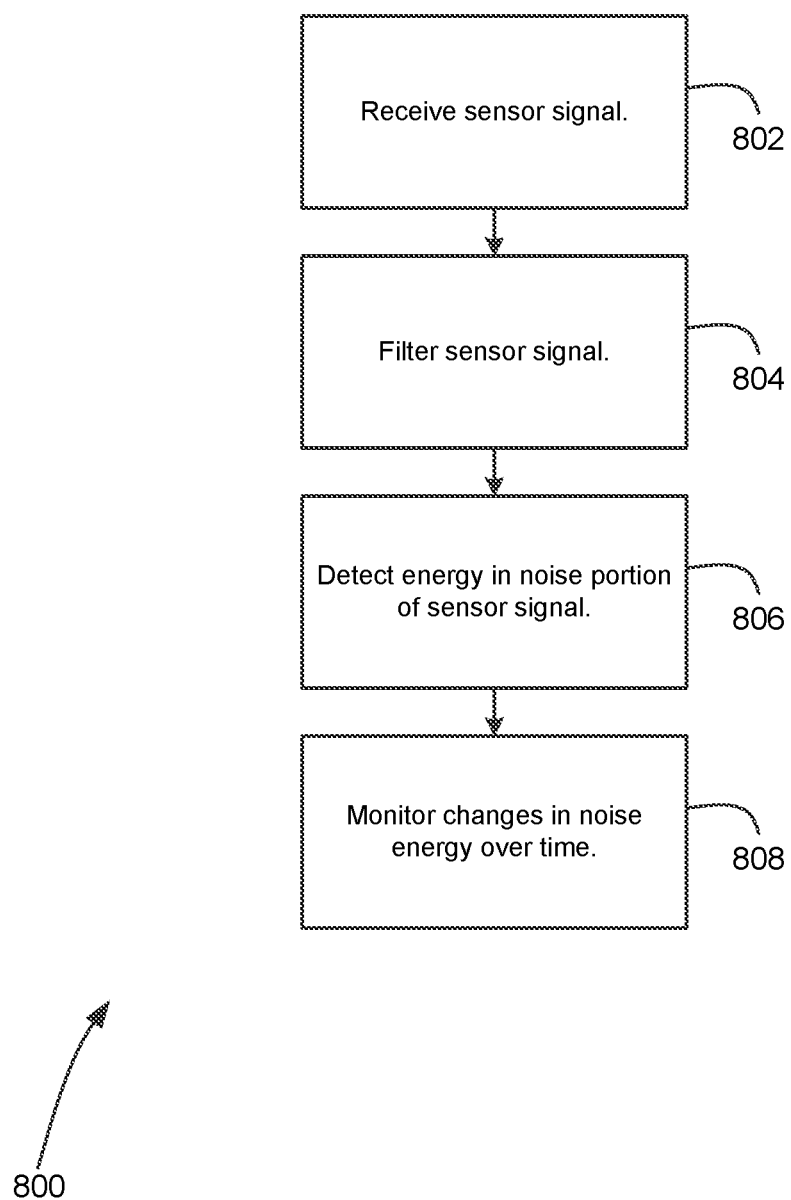
FIG. 8 is a flowchart illustrating another embodiment of a diagnostic test by the meter verification system.

Referring to FIG. 8, another suitable diagnostic test 800 for monitoring changes in a physical characteristic of the flowtube 15 monitors the frequency spectrum of the signal coming from sensors. At step 802, the diagnostic system 60 receives a sensor signal from the sensors 48*a*, 48*b*. Step 802 may include receiving one or both of the signals from sensors 48*a* and 48*b*. Moreover, step 802 may include receiving a signal directly from the sensors 48 or a signal that has been preprocessed in some way (e.g., combined, filtered through an anti-aliasing filter, etc.). At step 804, at least one signal from one of the sensors 48*a*, 48*b* is supplied to a band pass filter that filters out signal components whose frequencies are below the frequency of the drive signal provided to the drivers 46. The higher frequency noise portion of the signal is passed to a noise level detector where, in step 806, an amount of energy in the noise portion of a frequency spectrum of the signals is detected. Suitably, the diagnostic system 60 carries out steps 802-806 while the flowtube 15 is continually driven in a normal vibrational mode to obtain measurements. In step 808, the diagnostic system 60 monitors changes in the amount of energy in the noise portion of the frequency spectrum over time. For example, in one embodiment, the diagnostic system 60 compares the measured energy in the noise portion of the frequency spectrum to a predefined threshold. When the amount of energy in the noise portion of the frequency spectrum exceeds the threshold, then the diagnostic system 60 suitably outputs an indication that a physical characteristic of the flowtube has changed. Alternatively or additionally, in this method 800 the diagnostic system 60 compares the measured energy to previously measured energy amounts. When the amount of energy in the noise portion of the frequency spectrum changes by more than threshold amount, the diagnostic system 60 is configured to output an indication that a physical characteristic of the flowtube 15 has changed.

Figure 9:
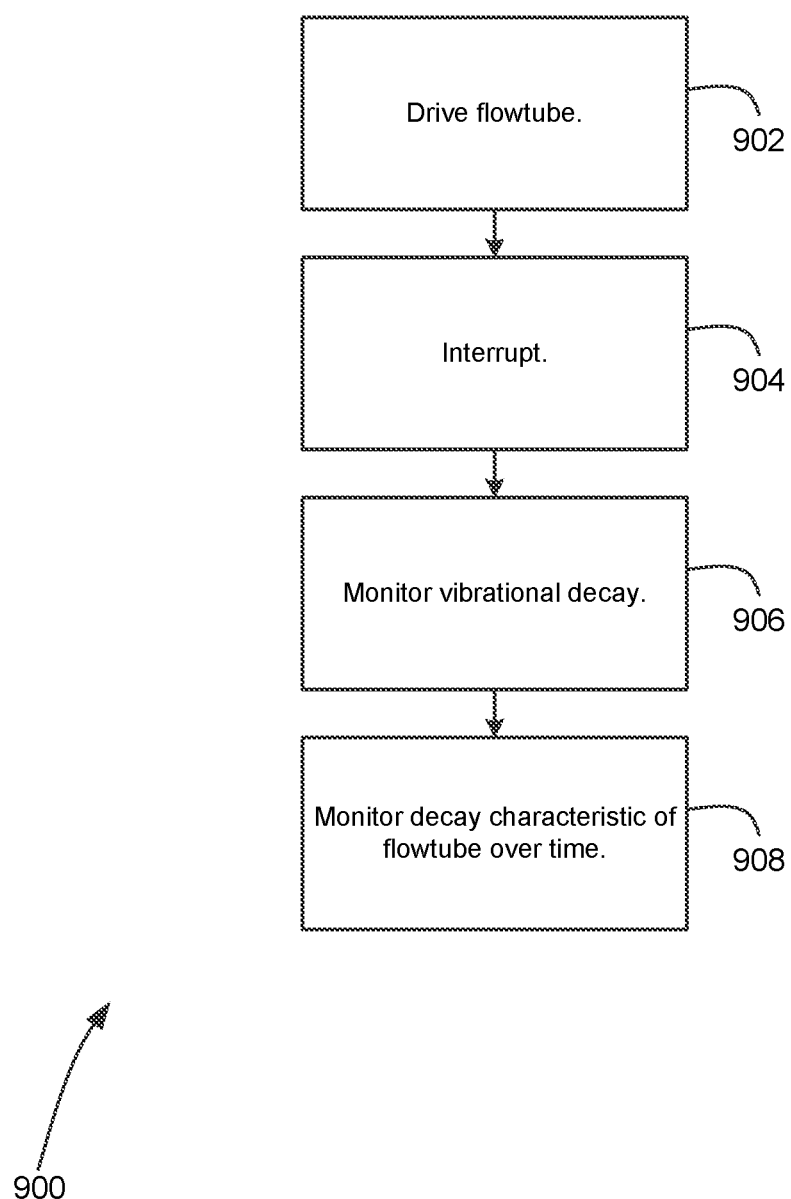
FIG. 9 is a flowchart illustrating still another embodiment of a diagnostic test by the meter verification system.

Referring to FIG. 9, another example of a suitable diagnostic test 900 is performed by considering a decay characteristic of the flowtube 15. In step 902, the flowtube 15 is driven in a vibrational mode, which can be its normal vibrational mode (e.g., the mode of vibration used to sustain vibration of the flowtube when mass flow and/or density measurements are made) or a secondary mode of vibration that is different from its normal operational mode. In either case, the flowtube is driven at a resonant frequency until, at step 904, the drive signal is interrupted and the vibration of the flowtube is permitted to decay. In step 906, the diagnostic system 60 monitors the vibrational decay of the flowtube. Based on the decaying signals, a decay characteristic of the flowtube can be monitored over time. For example, the decaying signals can suitably be used to measure a mechanical Q value of the flowtube 15. The measured mechanical Q value during a particular test 900 can be compared with a predefined threshold or prior measurements of the mechanical Q value to determine if a physical characteristic of the flowtube 15 has changed.

Figure 10:
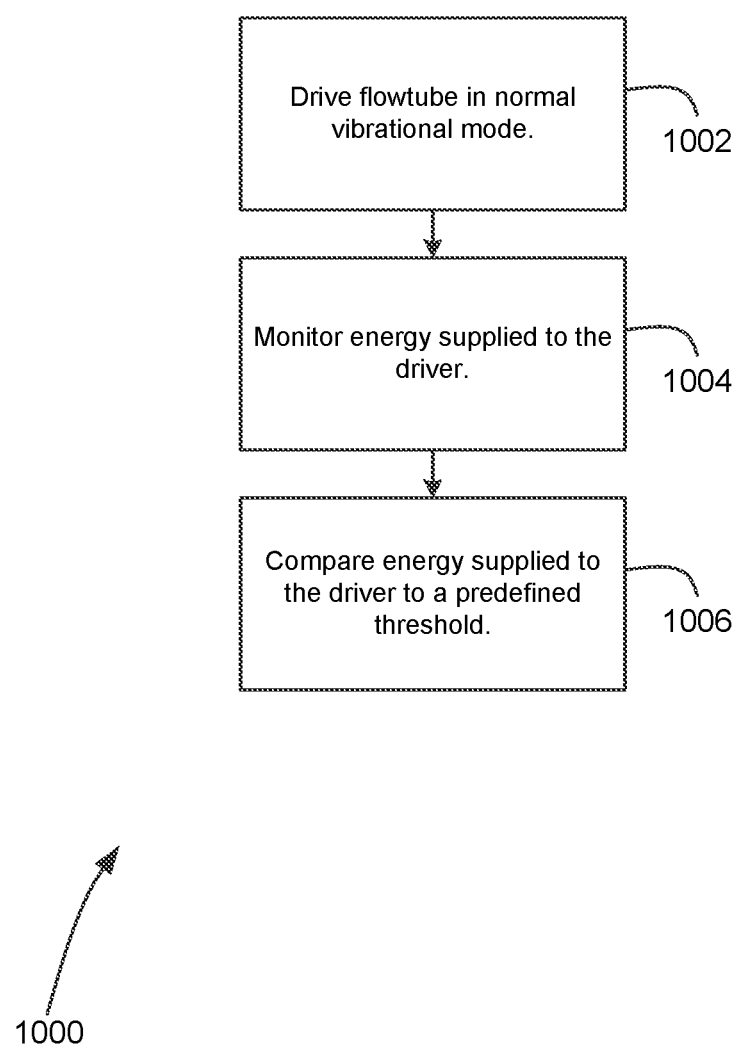
FIG. 10 is a flowchart illustrating yet another embodiment of a diagnostic test by the meter verification system.

Another suitable example of a diagnostic test 1000 is illustrated in FIG. 10. In this test 1000, the mechanical Q value of the flowtube 15 is monitored without interrupting the drive signal. Instead, a power meter is used to monitor the energy supplied to the drivers 46*a*, 46*b* during normal operation of the flowmeter 10. The energy measurement from the power meter is used by the diagnostic system 60 to determine whether a physical characteristic of the flowtube 15 has changed. Under certain conditions, an increase or decrease in the energy needed to sustain vibration of the flowtube 15 indicates a change in a physical condition of the flowtube. Thus, by monitoring changes in the energy supplied to the drivers 46*a*, 46*b*, changes in a physical condition of the flowtube 15 can be detected. In step 1002, the flowtube 15 is driven in its normal vibrational mode. At step 1004, the diagnostic system 60 measures the energy being supplied to one or both drivers 46*a*, 46*b*. The amount of energy may be an instantaneous amount of energy or it can be an average amount of energy (e.g., an average of multiple instantaneous amounts in a specified time interval). This amount of energy is compared to a threshold energy amount in step 1006 and/or to one or more previous amounts of measured energy to assess whether or not there have been changes in the physical condition of the flowtube 15.

Figure 11:
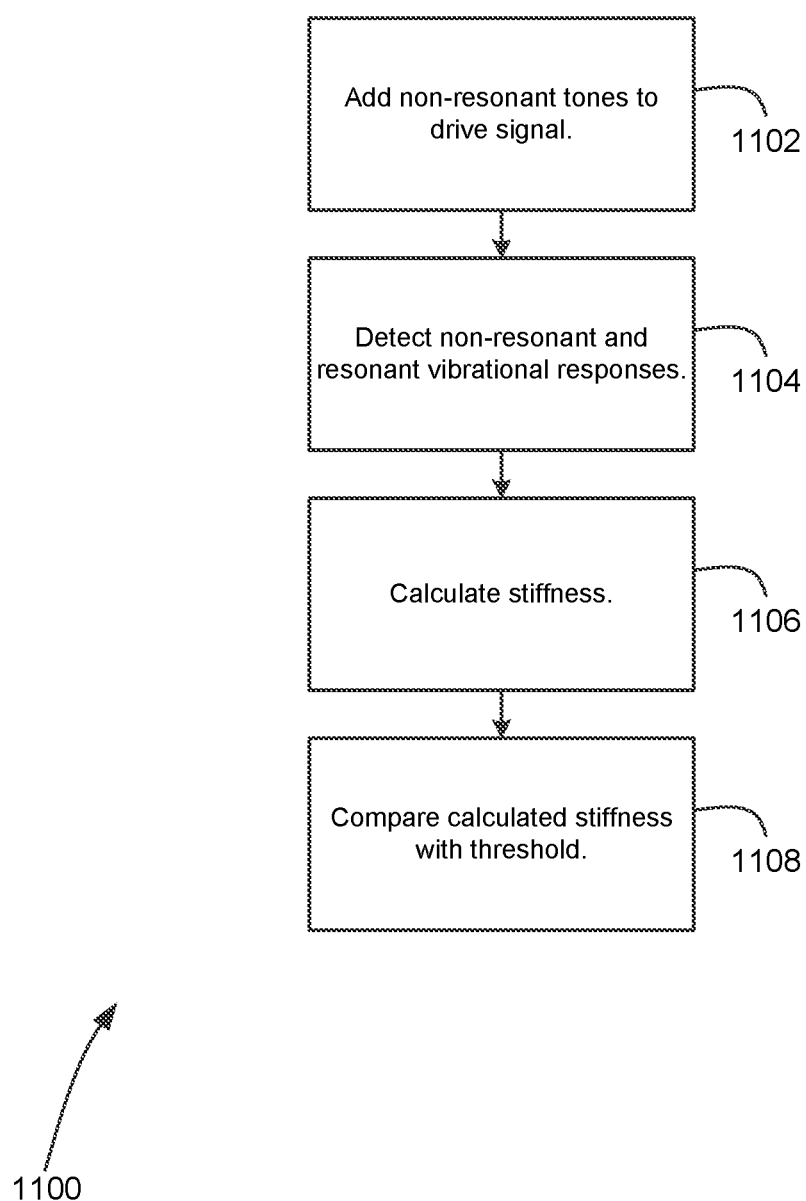
FIG. 11 is a flowchart illustrating one more embodiment of another diagnostic test by the meter verification system.

Referring to FIG. 11, in another embodiment of a diagnostic test 1100, the diagnostic system 60 calculates a stiffness of the flowtube 15 to detect structural changes in the flowtube that affect stiffness. For example, the stiffness of the flowtube 15 is suitably calculated by monitoring its response to multiple simultaneous vibrational inputs (e.g., non-resonant frequency tones added to a resonant frequency drive signal). However, other methods of calculating and monitoring changes in the stiffness of the flowtube 15 can be used in addition to or instead without departing from the scope of the invention. As discussed above, a flowtube 15 is typically driven at its resonant frequency to sustain vibration during normal operation of the flowmeter 10 to obtain measurements. As illustrated in FIG. 11, at step 1102 two or more non-resonant tones are suitably are added to the drive signal supplied to at least one of the drivers 46*a*, 46*b*. For example, corresponding pairs of non-resonant tones are suitably added to the drive signal at frequencies equally spaced apart at equal intervals spaced above and below the resonant frequency on the frequency spectrum. The non-resonant tones induce non-resonant vibrational responses of the flowtube 15. At step 1104, the non-resonant and resonant vibrational responses of the flowtube 15 are sensed and monitored by analysis of the signals from the sensors 48*a*, 48*b*. Based on the sensed non-resonant and resonant vibrational responses of the flowtube, a frequency response function is used in step 1106 to solve for the stiffness of the flowtube. One skilled in the art will appreciate that a the vibrational response of a flowtube 15 can be modeled as a frequency response function of, for example, the parameters of stiffness, mass, and damping. In the illustrated embodiment, the diagnostic system 60 has information about the vibrational inputs and vibrational responses of the flowtube 15 at multiple different tones. Using this information, the diagnostic system solves the frequency response function of the flowtube for stiffness. The calculated stiffness value is compared with a threshold at step 1108 to assess whether or not there have been structural changes to the flowtube 15. The threshold stiffness value may be predefined or may be based on one or more previously calculated stiffness values.

The diagnostic tests 600, 800, 900, 1000, and 1100 are merely exemplary of the types of diagnostic tests that may be performed in step 502 of the method of evaluating a Coriolis flowmeter 500. Other diagnostic tests may also be used without departing from the scope of the invention. Moreover, though the illustrated diagnostic tests 600, 800, 900, 1000, and 1100 are described in reference to a particular Coriolis mass flowmeter 10, it is understood that they may be used with many other different types of Coriolis flowmeters without departing from the scope of the invention.

Referring again to FIG. 5, certain process conditions adversely affect the reliability of the diagnostic test of step 502. Accordingly, in step 506, the diagnostic system 60 evaluates a reliability of the diagnostic test using information about one or more process conditions. For example, the diagnostic system 60 suitably uses information about at least one of the following process conditions to evaluate the reliability of the diagnostic test performed in step 502: an amount of energy supplied to the driver or drivers 46*a*, 46*b*, a frequency of the vibrational response of the flowtube 15, a damping characteristic of the flowtube, a temperature of the fluid, a temperature of the flowtube, a gas void fraction of the fluid, the mass flow rate of the fluid, a viscosity of the fluid, a density of the fluid, a pressure of the fluid, a control state of the flowtube, and an event associated with the distributed control system 54. As will be discussed in greater detail below, information about various ones of the above-listed process conditions can indicate that the diagnostic test is unreliable.

The diagnostic system 60 suitably outputs an indication of the results of the evaluation of step 506 using one of three indications displayed on one or more displays (e.g., a workstation of the distributed control system 54, a local display at the flowmeter 10, on a handheld device, etc.). When the diagnostic system 60 determines that the reliability of the diagnostic test performed in step 502 is low, for example, it suitably displays on the display a first indication (i.e., a low reliability indication). When the diagnostic system 60 determines that the reliability of the diagnostic test performed in step 502 is medium, at step 508 it displays on the display a second indication (i.e., a medium reliability indication). When the diagnostic system 60 determines that the reliability of the diagnostic test performed in step 502 is high, at step 508 it displays on the display a third indication (i.e., a high reliability indication). Each of the low, medium, and high indications may be displayed using any suitable content (e.g., color coded display objects, numerical representations, symbols, qualitative terms, descriptive images, etc.). Moreover, the results of the evaluation performed in step 506 may be output other ways without departing from the scope of the invention. For example, it is contemplated that more or fewer than three indicators may be used in certain embodiments. The indicators can be arranged, if desired, so that at least one indicator is used to distinguish between diagnostic test results of low reliability and high reliability. However, it may be desirable to output an indication of reliability in the form of a confidence interval instead.

There are various ways the diagnostic system 60 can evaluate the reliability of the results of a particular diagnostic test. For example, the diagnostic system 60 is suitably configured to use information about the amount of energy needed to drive oscillation of the flowtube 15 to evaluate the reliability of the diagnostic test performed in step 502 of the method 500 (step 506 of FIG. 5). For instance, the diagnostic system 60 is suitably configured to detect a change in the amount of energy supplied to the one or both of the drivers 46*a*, 46*b* to evaluate the reliability of the diagnostic test. High variability in the amount of energy supplied to the driver to oscillate the flowtube 15 can indicate the results are unreliable. For example, high variability in the energy supplied to the driver indicates the presence of rapidly changing (and in some cases non-normal) operating conditions (e.g., stall, initialization, secondary drive modes, system response to multiphase flow, etc.). Some diagnostic tests (e.g., the tests 800 and 1000 described above) are designed to be completed at least in part during normal operation of the flowmeter 10. Thus, by detecting variability in the amount of energy in the drive signal, non-normal operating conditions that diminish the reliability of certain diagnostic tests can be identified.

For instance, the diagnostic system 60 suitably measures the amount of energy supplied to one or more of the drivers 46*a*, 46*b* at two different times (e.g., just before and just after the diagnostic test is performed). The diagnostic system 60 subsequently calculates a change in the amount of energy (e.g., as a percentage change). Alternatively or additionally, the diagnostic system may take multiple measurements of the amount of energy supplied to one or more of the drivers and calculate a standard deviation of the measurements. The amount of change and/or standard deviation in the power used to drive the flowtube 15 can be used to characterize the level of reliability of a particular diagnostic test. For example, if the percentage change associated with a diagnostic test is less than about 100 percent, then the diagnostic system 60 suitably determines that the reliability is high and outputs an indication that the reliability is high (e.g., the third indication described above). If the percentage change is between about 100 percent and about 200 percent, then the diagnostic system 60 determines that the reliability is in a medium range outputs an indication that the reliability is medium (e.g., the second indication described above). If the percentage change exceeds about 200 percent, then the diagnostic system suitably determines that the reliability is low and outputs an indication that the reliability is low (e.g., the first indication described above). Similar ranges can be established for the standard deviation. The diagnostic system 60 can be configured to use any of a variety of multi-variable analyses to characterize the reliability of the diagnostic test on the basis of two or more variables.

Alternatively or additionally, the diagnostic system 60 is suitably configured to use information about the frequency of the vibrational response of the flowtube 15 to evaluate the reliability of the diagnostic test performed in step 502 of the method 500 (step 506 of FIG. 5). Variability in the frequency of the vibrational response of the flowtube 15 can sometimes indicate the results are unreliable. Variability in the vibrational response of the flowtube 15 indicates the presence of non-normal flow conditions (e.g., multiphase flow, etc.). Thus, by detecting variability in the frequency of the vibrational response, non-normal flow conditions that diminish the reliability of certain diagnostic tests can be identified.

Suitably, the diagnostic system 60 characterizes the vibrational response of the flowtube at two different times (e.g., just before and just after the diagnostic test is performed).

For example, the resonant frequency can be used as a characterizing feature of the vibrational response. The diagnostic system 60 subsequently calculates a change in the vibrational response (e.g., percentage change in the resonant frequency) of the flowtube 15 associated with the diagnostic test. Alternatively or additionally, the diagnostic system 60 can characterize the frequency response at multiple different times and calculate a standard deviation related to the frequency response at each of the multiple times (e.g., a standard deviation of the resonant frequency). The amount of change in the frequency response and/or the standard deviation associated with the frequency response can be used to characterize the reliability of the test. For example, if the percentage change in the resonant frequency associated with the diagnostic test is between 0 percent and about 1 percent, then the diagnostic system 60 suitably determines the reliability is high and outputs an indication that the reliability is high (e.g., the third indication described above). If the percentage change is between about 1 percent and about 2 percent, then the diagnostic system 60 suitably determines that the reliability of the test is in the medium range and outputs an indication that the reliability is medium (e.g., the second indication described above). If the percentage change exceeds about 2 percent, then the diagnostic system 60 suitably determines that the reliability is low and outputs an indication that the reliability is low (e.g., the first indication described above).

The diagnostic system 60 suitably determines the resonant frequency of the vibrational response of the flowtube during a time associated with a particular diagnostic test and compares this resonant frequency to a set of frequency values defined with reference to a median frequency of vibration for the flowtube 15, either in addition to or as an alternative to other options discussed herein for assessing reliability of the diagnostic test. For example, if the measured frequency of vibration associated with a diagnostic test is within about 1 percent of the median value, the diagnostic system suitably determines that the reliability is high and outputs an indication that the reliability is high. If the measured frequency of vibration differs from the median value by between about 1 percent and about 2 percent, the diagnostic system suitably determines that the reliability is in a medium range and outputs an indication the reliability is medium. And if the measured frequency of vibration differs from the median frequency of vibration by more than about 2 percent, the diagnostic system suitably determines that the reliability is low and outputs an indication that the reliability is low.

Also, instead of or in addition to the other alternatives described herein, the diagnostic system 60 is suitably configured to monitor a temperature signal from one or both of the temperature sensors 52 and 53 to assess reliability of the diagnostic test. Temperature changes can affect many of the physical characteristics of the flowtube 15. Thus temperatures that are outside of a normal operating range may lead to unreliable diagnostic test results. For example, the diagnostic system 60 suitably uses a measured temperature value that is determined from the monitored temperature signal while the diagnostic test is being performed or shortly before or after the test. The measured temperature value is compared with a set of thresholds centered on a median or expected temperature value or temperature range. For example, if the measured temperature is within about 20 percent of the median or expected value or range of values, the diagnostic system 60 suitably determines that the reliability is high outputs an indication that the reliability is high. If the measured temperature differs from the median or expected temperature values or ranges by between about 20 percent and 30 percent, the diagnostic system 60 suitably determines that the reliability is in a medium range and outputs an indication the reliability is medium. And if the measured temperature differs from the median or expected temperature value or ranges by more than about 30 percent, the diagnostic system suitably determines that the reliability is low and outputs an indication that the reliability is low.

The technique described for evaluating the reliability of a diagnostic test based on a temperature value measured during or prior to performing the diagnostic test may also be used, either additionally or alternatively, to evaluate the reliability based on other variables, including for example, mass flow rate, viscosity, pressure, and/or density of the fluid. Substantial deviation from normal operating conditions for any of these parameters can adversely affect the reliability of the diagnostic test.

As yet another example, the diagnostic system 60, suitably evaluates the reliability of the diagnostic test performed in step 502 by measuring the void fraction at the time of the diagnostic test. Coriolis flowmeters are sometimes expected to encounter primarily single phase liquid flow conditions. The presence of a high void-fraction is a non-normal flow condition that can affect the operation of the flowmeter and/or the vibrational response of the flowtube. Thus, the diagnostic system 60 is suitably configured to receive the void fraction measurement from the control and measurement system 50 and use the void fraction measurement to assess reliability of the diagnostic test. For example, if the void fraction measurement is between 0 and about 1 percent, the diagnostic system 60 suitably determines that the reliability is high and outputs an indication that the reliability of the diagnostic test is high. If the void fraction measurement is between about 1 percent and about 5 percent, the diagnostic system 60 suitably determines that the reliability is in a medium range and outputs an indication that the reliability of the diagnostic test is medium. And if the void fraction measurement is above about 5 percent, the diagnostic system 60 suitably determines that the reliability is low and outputs an indication that the reliability of the diagnostic test is low.

Additionally or alternatively, the diagnostic system 60 can be configured to base its evaluation of the reliability of the diagnostic test on conditions internal to the flowmeter 10, such as its control state. As discussed above, the illustrated flowmeter 10 (FIG. 2) includes control and measurement system 50 configured to operate in a plurality of control states at different times and/or in response to different events or circumstances. The diagnostic system 60 can output an indication of low reliability if, for example, in performing step 506 it determines the control and measurement system is currently or has recently (with respect to performance of the diagnostic test of step 502) been operating in a non-normal control state. Similarly, the diagnostic system can be configured to output an indication of low reliability if it has recently changed between different control states.

Additionally or alternatively, the diagnostic system 60 may be configured to base its evaluation of the reliability of the diagnostic test using information from the distributed control system 54. For example, the diagnostic system may receive an indication of a control event occurring in a distributed control system and evaluate the reliability of the diagnostic test based on its temporal proximity to the event. Some examples of relevant events in a distributed control system that can be used to assess reliability include without limitation, initialization of an upstream pump, opening or closing of an upstream or downstream valve, initialization of a fluid heating element, or any other event that can affect operation of the flowmeter 10. The specific events that might affect the flowmeter 10 can vary significantly depending on the characteristics and features of the process controlled by the distributed control system 54. The diagnostic system 60 can be configured to communicate with the distributed control system 54 to determine whether or not any such events have occurred and output an indication of low reliability if the diagnostic test of step 502 is run within a predetermined amount of time after the occurrence of a respective event.

Again, any combination of variables described herein can be used to evaluate the reliability of the diagnostic test by defining multi-dimensional criteria for characterizing reliability of the diagnostic test. Other variables not explicitly mentioned herein can also be considered in the evaluation of the reliability of the diagnostic test. For example, it is contemplated that in some embodiments a diagnostic system evaluates the reliability of a diagnostic test based on a plurality of variables and the diagnostic system 60 is configured to assign weighted scores to each of the plurality of process conditions and calculate a weighted average of the scores to assess reliability of the diagnostic test. The weighted average of the scores is used to provide an indication of reliability. As another example, various different reliability categories (e.g., high, medium, and low) can be defined in a multi-dimensional space associated with any desired combination of variables and the diagnostic system 60 is configured to evaluate reliability by identifying which of the defined categories corresponds with the values for the variables associated with the particular diagnostic test. In still another example, the diagnostic system 60 is configured to monitor a plurality of the variables and identify which of the values for the monitored set of variables is associated with the lowest indication of reliability. The lowest indication of reliability is used as the output of step 508. Still other methods for taking multiple process variables into account may also be used without departing from the scope of the invention.

Several examples of methods for evaluating the reliability of a diagnostic test are discussed above. In some of these examples, specific values are provided for as examples for values or ranges of values that correspond with a particular level of reliability. It is recognized that the configurations of Coriolis mass flowmeters are highly varied. Thus, the above-described values should be considered to be illustrative, and not in a limiting sense. It is also possible that the end user of the flowmeter can set or change the parameters that correspond with a particular level of reliability to suit their needs based on their own experience.

The principles and methods illustrated above in detail in the context of a Coriolis meter can be applied to other types of flowmeters without departing from the scope of the invention. For example, the flowmeter can be a vortex flowmeter, a magnetic flowmeter, or any other type of flowmeter. The diagnostic system can evaluate the reliability of the diagnostic test using any process condition that might affect the diagnostic test. For example, the diagnostic system can evaluate the reliability of the diagnostic test by evaluating one or more process conditions to assess whether or not the flowmeter is operating in a relatively steady-state environment or is operating in more non-steady state environment characterized by abrupt changes in the characteristics of the fluid or other factors affecting operation of the flowmeter.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements. In view of the above, it will be seen that the several objects of the invention are achieved and other advantageous results attained.

As various changes could be made in the above systems, devices, and methods without departing from the scope of the invention, it is intended that all matter contained in the above description and shown in the accompanying drawings shall be interpreted as illustrative and not in a limiting sense.

What is claimed is:

1. A method for evaluating a Coriolis mass flowmeter having a flowtube, a driver for driving the flowtube, a pair of sensors for sensing a vibrational response of the flowtube at different locations and providing signals representative of the vibrational response, and a processor configured to determine a mass flow rate of a fluid flowing through the flowtube based on a phase difference between the sensor signals, the method comprising:
    performing a diagnostic test for detecting a physical change in the flowtube that could impair operation of the Coriolis mass flowmeter;
    outputting a result of the diagnostic test;
    evaluating a reliability of the diagnostic test using information about process conditions; and
    outputting an indication of the reliability of the diagnostic test.

2. The method of claim 1 wherein the evaluating comprises using information about at least one of the following process conditions: an amount of energy supplied to the driver, a frequency of the vibrational response of the flowtube, a damping characteristic of the fluid, a temperature of the fluid, a temperature of the flowtube, a gas void fraction of the fluid, the mass flow rate of the fluid, a viscosity of the fluid, a density of the fluid, a pressure of the fluid, a control state of the flowtube, and an event in a distributed control system.

3. The method of claim 1 wherein the evaluating comprises using information about the frequency of the vibrational response of the flowtube.

4. The method of claim 3 wherein the evaluating comprises detecting a change in the frequency of the vibrational response of the flowtube.

5. The method of claim 1 wherein said performing the diagnostic test comprises:
    driving the flowtube in a first vibrational mode;
    sensing a first vibrational response of the flowtube to the first vibrational mode;
    driving the flowtube in a second vibrational mode;
    sensing a second vibrational response of the flowtube to the second vibrational mode;
    determining a resonant frequency of the first and second vibrational responses; and
    computing a ratio of the resonant frequency of the first vibrational response to the resonant frequency of the second vibrational response.

6. The method of claim 5 wherein the first vibrational mode comprises a symmetrical mode and the second vibrational mode comprises an anti-symmetrical mode.

7. The method of claim 1 wherein said performing the diagnostic test comprises at least one of the following: (i) detecting an amount of energy in a noise portion of a frequency spectrum of the signals from the sensors while driving the flowtube and monitoring changes in the amount energy in the noise portion of the frequency spectrum over time; (ii) monitoring the signals from the sensors after de-energizing the driver to detect a decay characteristic of the signals; (iii) and calculating a stiffness of the flowtube to detect any structural changes in the flowtube that affect stiffness.

8. The method of claim 1 wherein that method comprising calculating a stiffness of the flowtube to detect any structural changes in the flowtube that affect stiffness by sensing at least three vibrational responses of the flowtube using the sensors, one of the at least three vibrational responses being responsive to a vibration of the flowtube at a substantially resonant frequency of the flowtube and the others of the at least three vibrational responses being responsive to vibrations of the flowtube at non-resonant frequencies of the flowtube.

9. The method of claim 1 wherein said outputting the indication of the reliability of the diagnostic test comprises displaying on a display a first indication when the reliability is low, a second indication when the reliability is medium, and a third indication when the reliability is high, the first, second, and third indications being different from one another.

10. The method of claim 1 further comprising using the diagnostic test to detect at least one of corrosion of the flowtube, erosion of the flowtube, and fatigue of the flowtube.

11. A system for evaluating a mass flow rate measurement, the system comprising:
a Coriolis flowmeter comprising:
a flowtube;
a driver for driving the flowtube; and
a pair of sensors for sensing a vibrational response of the flowtube at different locations and providing sensor signals representative of the vibration; and
a diagnostic system configured to:
perform a diagnostic test for detecting a physical change in the flowtube that could impair operation of the Coriolis mass flowmeter;
output a result of the diagnostic test;
evaluate a reliability of the diagnostic test using information about a process condition; and
output an indication of the reliability of the diagnostic test.

12. The system for evaluating a mass flow rate measurement of claim 11 wherein the diagnostic system is configured to use information about at least one of the following process conditions to evaluates the reliability of the diagnostic test: an amount of energy supplied to the driver, a frequency of the vibrational response of the flowtube, a damping characteristic of the flowtube, a temperature of the fluid, a temperature of the flowtube, a gas void fraction of the fluid, the mass flow rate of the fluid, a viscosity of the fluid, a density of the fluid, a pressure of the fluid, a control state of the flowtube, and an event in a distributed control system.

13. The system for evaluating a mass flow rate measurement of claim 11 wherein the diagnostic system is configured to use information about the frequency of the vibrational response of the flowtube to evaluate the reliability of the diagnostic test.

14. The system for evaluating a mass flow rate measurement of claim 13 wherein the diagnostic system is configured to detect a change in the frequency of the vibrational response of the flowtube to evaluate the reliability of the diagnostic test.

15. The system for evaluating a mass flow rate measurement of claim 11 wherein, the diagnostic system is configured to:
drive the flowtube in a first drive mode;
sense a first vibrational response of the flowtube to the first vibrational mode;
drive the flowtube in a second drive mode;
sense a second vibrational response of the flowtube to the second vibrational mode;
determine a resonant frequency of the first and second vibrational responses; and
compute a ratio of the resonant frequency of the first vibrational response to the resonant frequency of the second vibrational response.

16. The system for evaluating a mass flow measurement of claim 15 wherein the first vibrational mode comprises a symmetrical mode and the second vibrational mode comprises an anti-symmetrical mode.

17. The system for evaluating a mass flow rate measurement of claim 11 wherein the diagnostic system is configured to do at least one of the following: (i) detect an amount of energy in a noise portion of a frequency spectrum of the signals from the sensors while driving the flowtube and to monitor changes in the amount of energy in the noise portion of the frequency spectrum over time; (ii) monitor the signals from the sensors after de-energizing the driver to detect a decay characteristic of the signals; and (iii) calculate a stiffness of the flowtube to detect any structural change in the flowtube that affects stiffness.

18. The system for evaluating a mass flow rate measurement of claim 11 wherein the sensors sense at least three vibrational responses of the flowtube, one of the at least three vibrational responses being responsive to a vibration of the flowtube at a substantially resonant frequency of the flowtube and the others of the at least three vibrational responses being responsive to vibrations of the flowtube at non-resonant frequencies of the flowtube.

19. The system for evaluating a mass flow rate measurement of claim 11 wherein the diagnostic system is further configured to display on a display a first indication when the reliability is low, a second indication when the reliability is medium, and a third indication when the reliability is high, the first, second, and third indications being different from one another.

20. The system for evaluating a mass flow rate measurement of claim 11 wherein the diagnostic system is configured to detect at least one of corrosion of the flowtube, erosion of the flowtube, and fatigue of the flowtube.

* * * * *